United States Patent
Tollenaar

(10) Patent No.: US 6,705,056 B2
(45) Date of Patent: Mar. 16, 2004

(54) DRYWALL BACKING APPARATUS AND METHOD OF INSTALLING SAME

(75) Inventor: Daniel W. Tollenaar, Des Moines, IA (US)

(73) Assignee: Kathy M. Tollenaar, Des Moines, IA (US)

( * ) Notice: Subject to any disclaimer, the term of this patent is extended or adjusted under 35 U.S.C. 154(b) by 0 days.

(21) Appl. No.: 09/999,874

(22) Filed: Oct. 19, 2001

(65) Prior Publication Data
US 2003/0074846 A1 Apr. 24, 2003

(51) Int. Cl.[7] .................................................. E04B 1/94
(52) U.S. Cl. ........................................... 52/317; 52/696
(58) Field of Search ....................... 52/317, 690, 696, 52/712, 364

(56) References Cited

U.S. PATENT DOCUMENTS

| | | | | | |
|---|---|---|---|---|---|
| 4,453,362 A | * | 6/1984 | Rodgers | ........................ | 52/481 |
| 4,596,101 A | * | 6/1986 | Brinker | ........................ | 52/317 |
| 4,619,304 A | * | 10/1986 | Smith | ........................ | 160/135 |
| 4,658,556 A | * | 4/1987 | Jenkins | ........................ | 52/317 |
| 4,696,132 A | * | 9/1987 | LeBlanc | ........................ | 52/394 |
| 4,976,075 A | * | 12/1990 | Kaveckis et al. | ................ | 52/71 |
| 5,189,857 A | * | 3/1993 | Herren et al. | ................. | 52/317 |
| 5,249,400 A | * | 10/1993 | Turner | ........................ | 52/364 |
| 5,551,200 A | * | 9/1996 | Krug | ........................ | 52/696 |
| 6,189,277 B1 | * | 2/2001 | Boscamp | ........................ | 52/317 |
| 6,253,529 B1 | * | 7/2001 | De Boer | ........................ | 52/763 |
| 6,260,318 B1 | | 7/2001 | Herren | | |
| 6,334,287 B1 | * | 1/2002 | Fick | ........................ | 52/745.11 |
| 6,389,762 B2 | * | 5/2002 | LePoire | ........................ | 52/204.2 |

FOREIGN PATENT DOCUMENTS

| | | | | |
|---|---|---|---|---|
| JP | 406306949 | * | 11/1994 | ................... 52/690 |
| JP | 406307022 | * | 11/1994 | ................... 52/690 |

* cited by examiner

*Primary Examiner*—Lanna Mai
*Assistant Examiner*—Hanh V. Tran
(74) *Attorney, Agent, or Firm*—Sturm & Fix LLP

(57) ABSTRACT

A method and apparatus for installing backing in walls which include a first, second and third upright U-shaped stud. A first backing member has a first end, a second end, a top, a bottom, a first side and a second side. The first backing member is disposed between the first and second studs. A second backing member has a first end, a second end, a top, a bottom, a first side and a second side. The second backing member is disposed between said second and third studs. A hinge is operatively attached to the first side of the first and second backing members for permitting the second backing member to pivot with respect the first backing member between a first position wherein the first side of each of the first and second backing members are substantially in the same plane and a second position whereby the first and second backing members are not in the same plane. This permits the first backing member to be placed between a first and second adjacent vertical stud. Then the second backing member is pivoted with respect to the first backing member. After that, the second backing member is pivoted to a position to be disposed between the second vertical stud and the third stud which is adjacent to said second stud, whereby the second end of the first backing member is adjacent to and on one side of the first stud and the first end of the second backing member is adjacent to and on the other side of the first stud. More than two backing members can be tied together with a hinge if desired.

41 Claims, 5 Drawing Sheets

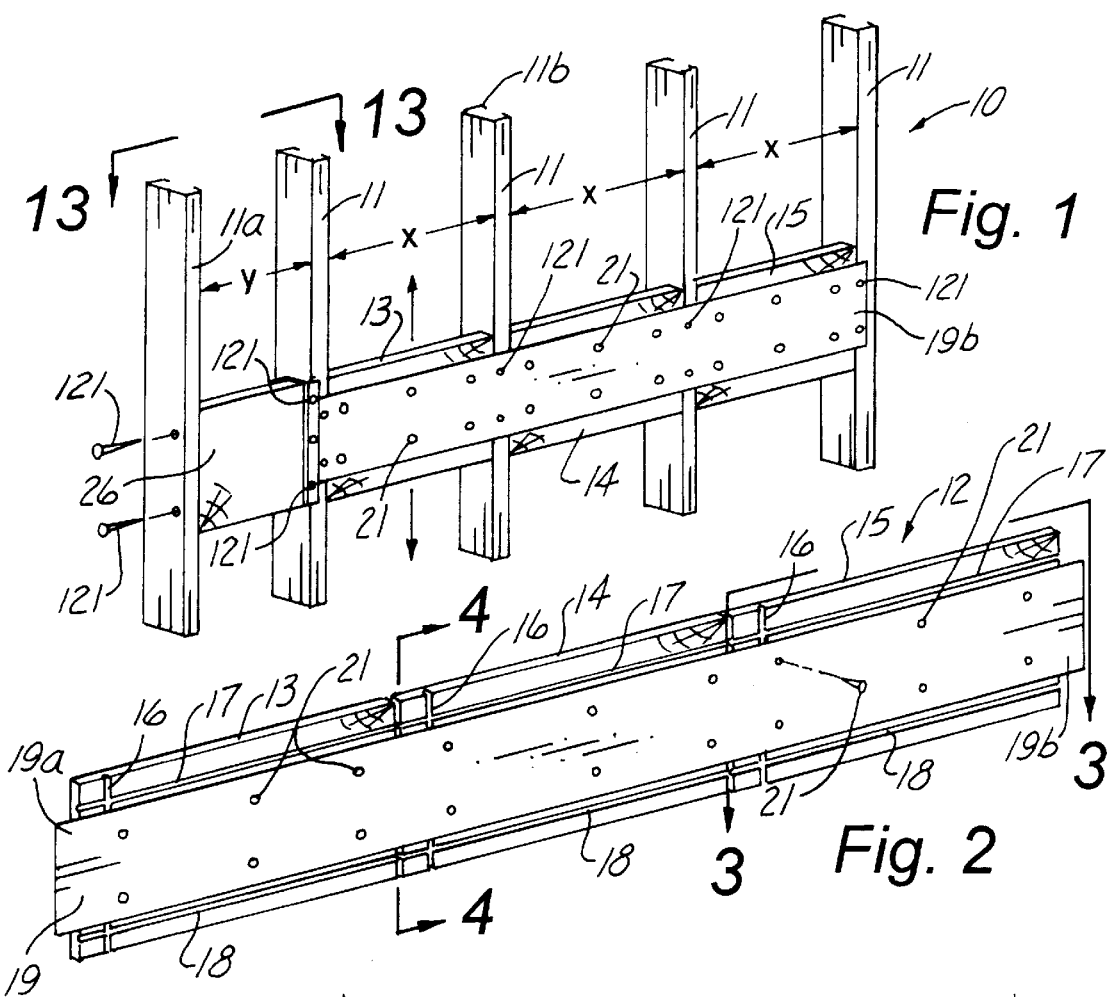
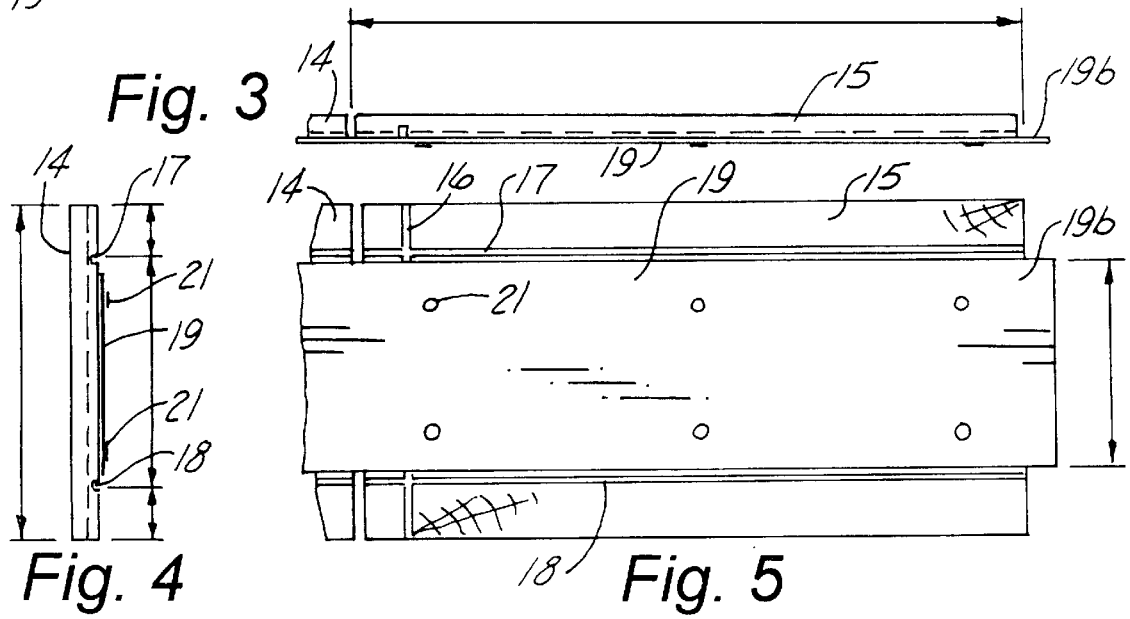

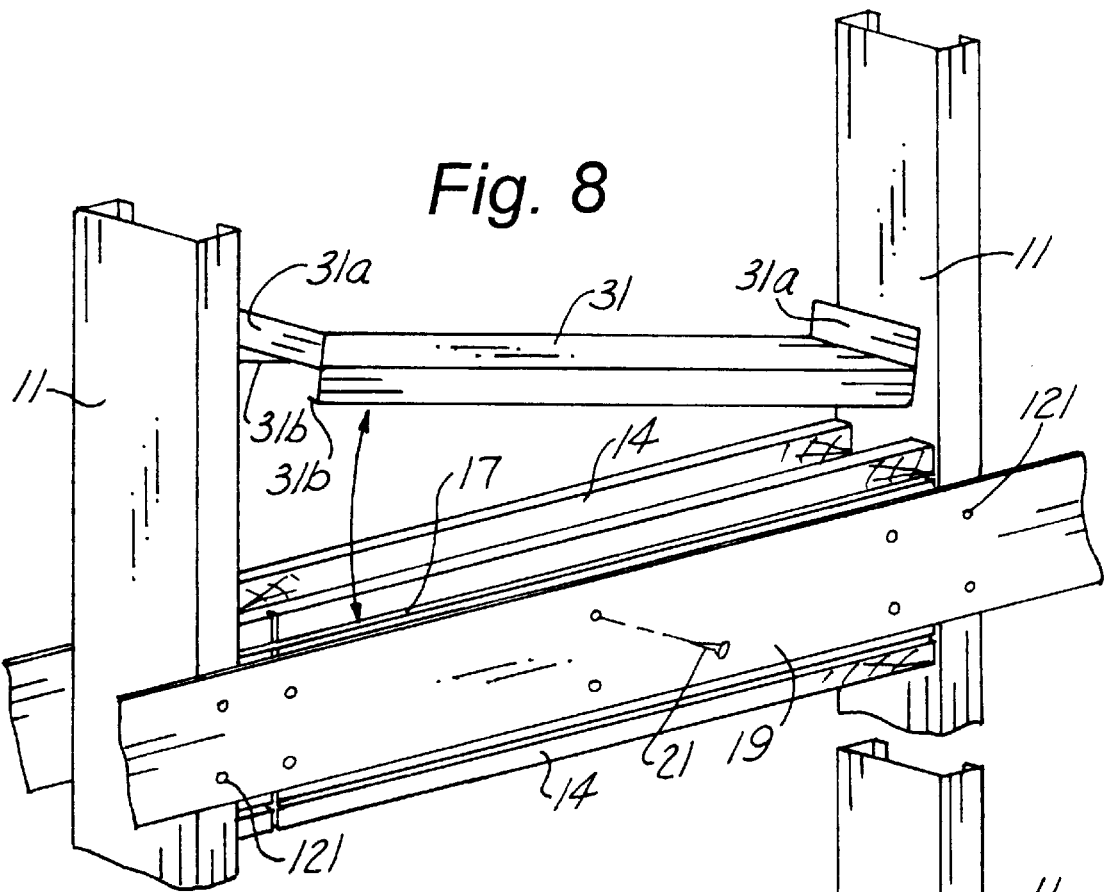
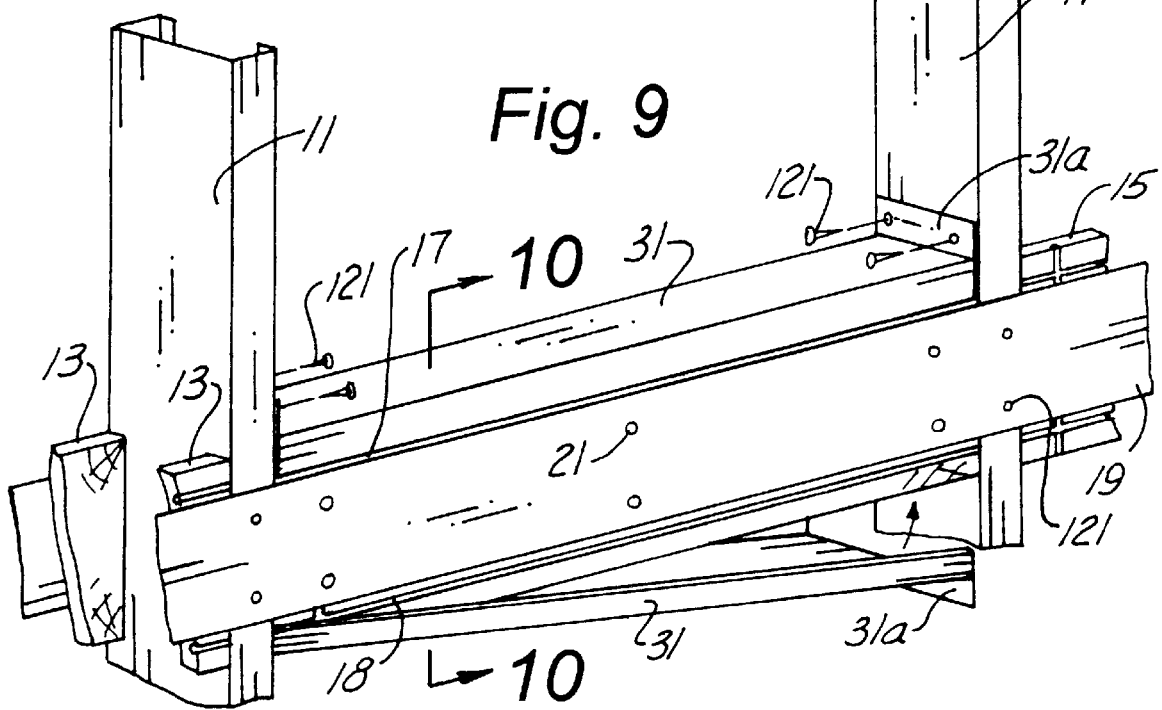

DRYWALL BACKING APPARATUS AND METHOD OF INSTALLING SAME

BACKGROUND OF THE INVENTION

1. Field of the Invention

The present invention relates to wall construction, and more particularly to a method and apparatus for anchoring wall mounted structures such as handrails and grab bars.

2. Description of Prior Art

Historically, the framework of a building wall was formed entirely of wood members, including wooden studs. In recent years at least in the United States, however, the use of metal studs has gained acceptance, especially in commercial buildings, such as office buildings and hospitals. It has been found that metal studs can be advantageously employed, since a suitable metal, such as galvanized steel, is stronger than wood, will not rot, is not subject to damage by pests such as termites, remains resistant to fire, and is economically feasible.

Metal studs are typically formed of sheet metal bent to encompass a cross sectional area having nominal dimensions of two inches by four inches. To conform to architectural plans and building code requirements, metal studs are formed of sheet metal bent into a generally U-shaped cross-section in which a relatively broad central base is flanked by a pair of narrower sides that are bent at right angles to the base. The base typically has a uniform nominal width of either four inches or 3⅝ inches, which is commonly referred to as the web. The sides of the U-shaped stud typically extends to a nominal distance of two inches from the base which are commonly referred to as flanges. To enhance structural rigidity to the flanges of the stud, the flanges are normally bent over into a plane parallel to and spaced from the plane of the web. These turned over edges of the sides thereby form marginal lips which are typically one quarter to one half inch in width. Conventionally, the metal studs are erected with the webs oriented on the same side in the same direction.

In building construction, there are certain situations which require the building studs to be braced or linked transversely to provide enhanced structural rigidity. The studs must be transversely bridged when they are over eight feet in length so that they provide adequate stability in a lateral direction within the wall which they support.

In certain instances, the metal studs require transverse backing between the studs in a building so to provide structural support against forces acting normal to or parallel to the plane of the wall assembly. For example, structural backing must be provided between adjacent parallel studs to provide necessary structural stability for the installation wall structures such as hand rails and grab bars most which conform to requirements of the Americans with Disabilities Act, i.e., withstand 250 pounds of point load pressure outward and downward parallel to the plane of the wall. A common way to provide backing is to shape pieces of plywood between adjacent studs and use screw fasteners to attach these pieces to adjacent studs. The number and placement of backing plywood pieces is determined by how much of the framework needs backing.

The use of fire-stops, bridging and backing in construction trade is well known in the prior art. Construction Codes and Fire Codes requires that these devices be positioned between metal studs to: (1) reinforce uniformly laterally spaced parallel metal studs; (2) discourage the spread of fire, smoke and gases within interior walls; and (3) anchor hand rails and grab bars to metal studs. Typically, sheetrock covers the studs and backing and is attached thereto.

BRIEF SUMMARY OF THE INVENTION

The present invention relates to a method and apparatus for installing backing in walls which include a first, second and third upright U-shaped stud. A first backing member has a first end, a second end, a top, a bottom, a first side and a second side. The first backing member is disposed between the first and second studs. A second backing member has a first end, a second end, a top, a bottom, a first side and a second side. The second backing member is disposed between said second and third studs. A hinge is operatively attached to the first side of the first and second backing members for permitting the second backing member to pivot with respect to the first backing member between a first position wherein the first side of each of the first and second backing members are substantially in the same plane and a second position whereby the first and second backing members are not in the same plane. This permits the first backing member to be placed between a first and second adjacent vertical stud. Then the second backing member is pivoted with respect to the first backing member. After that, the second backing member is pivoted to a position to be disposed between the second vertical stud and the third stud which is adjacent to said second stud, whereby the second end of the first backing member is adjacent to and on one side of the first stud and the first end of the second backing member is adjacent to and on the other side of the first stud. More than two backing members can be tied together with a hinge if desired.

Therefore, an object of the present invention is the provision of an improved dry wall backing apparatus and method of installing same.

Another object is to provide a fire break structure.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 1 is a partial perspective view of a plurality of metal studs having the present invention attached thereto;

FIG. 2 is a preferred embodiment of the present invention shown in a perspective view;

FIG. 3 is a cross sectional view taken along line 3—3 of FIG. 2;

FIG. 4 is a cross sectional view taken along line 4—4 of FIG. 2;

FIG. 5 is a partial front view of a right side portion of the invention shown in FIG. 2;

FIG. 8 is a partial perspective view showing how a fire break portion is attached;

FIG. 9 is a perspective view showing how a bottom fire break member can also be attached if desired;

DETAILED DESCRIPTION OF THE BEST MODES OF THE INVENTION

Figure 6:
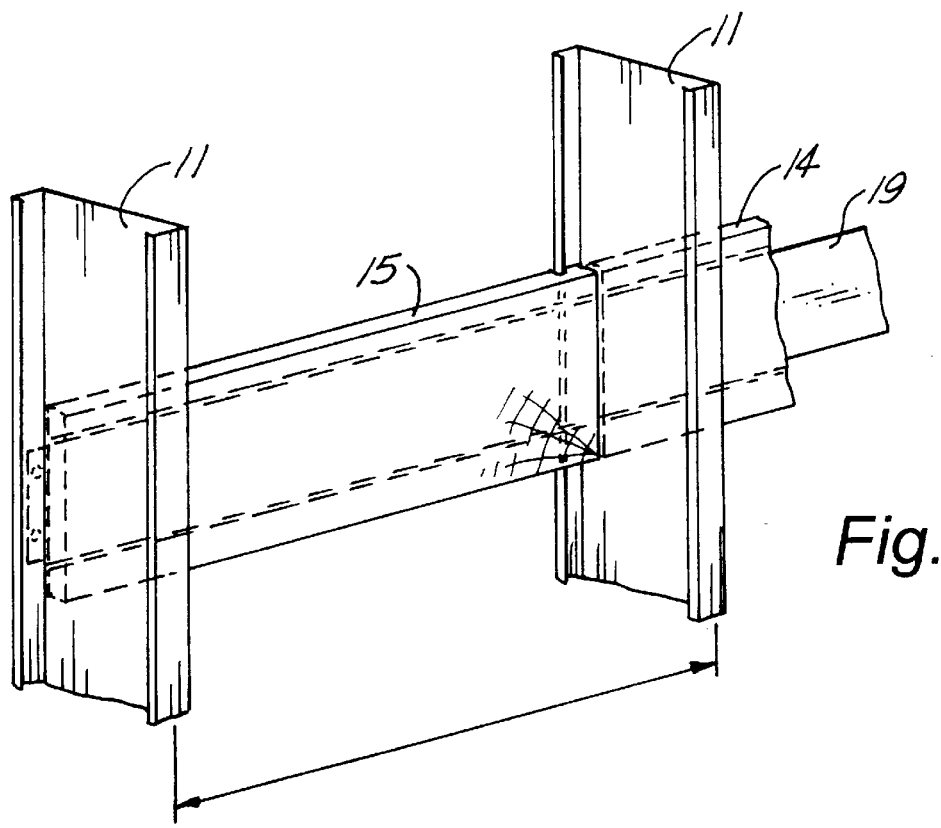
FIG. 6 is a perspective view from the back side of that shown in FIG. 1 in a perspective view.

Referring now to the drawings, wherein like reference numerals designate identical or corresponding parts throughout the several views, FIG. 1 shows the present invention in use as a unit as indicated by the structure (10). Upright metal studs (11) are spaced equally apart and a stud (11a) is spaced a distance (y) which is shorter than the distance (x) that the other studs (11) are spaced from each other. This invention can also be used with studs (11) in ceilings or floors.

Referring to FIG. 2, a backing structure (12) is shown in a preferred embodiment which has three wooden backing members (13), (14) and (15) each having vertical grooves (16) on one end thereof and top and bottom horizontal grooves (17) and (18). A flexible metal hinge (19) is in a preferred embodiment constructed of galvanized sheet metal such as steel but could be any other flexible material. This flexible metal piece (19) serves as a hinge between the first backing member (13) and the second backing member (14) and likewise forms a hinge between the second backing member (14) and the third backing member (15). This hinge (19) could also be any kind of a hinge, for example, between the first backing member (13) and the second backing member (14) and does not need to be a one-piece member with a hinge between the second backing member (14) and the third backing member (15). It is, however, advantageous to have piece (19) extend from beyond the left side of backing member (13) to the right side of the third backing member (15) as shown in FIG. 2 because, not only does it then serve as a double hinge, but also the protruding edges on both ends thereof can easily be attached to the studs (11) as will be described below. The backing members (13), (14) and (15) in this preferred embodiment are constructed of plywood, but they could be a solid piece of wood or any other suitable material useful as a backing member. Screws (21) are used to attach the sheet metal member (19) to each of the backing members (13), (14) and (15), but other ways of attaching the hinge (19) to the backing members (13), (14) or (15) would be fully equivalent thereto.

Figure 7:
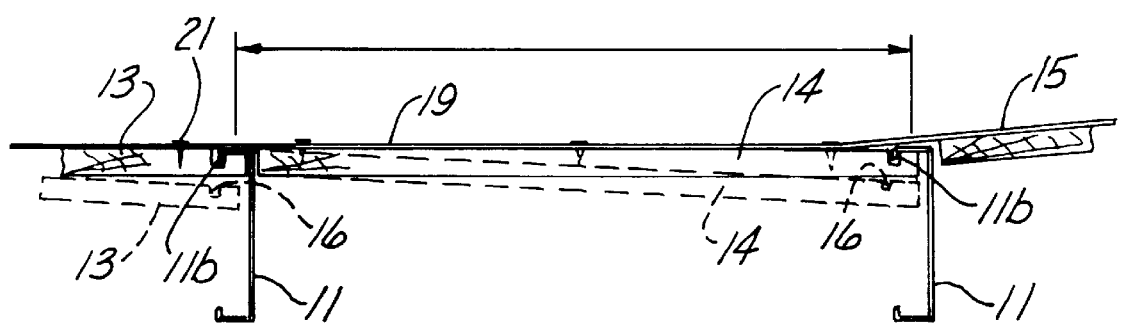
FIG. 7 is a top view showing how the invention is placed onto a pair of metal U-shaped studs.

Referring now to FIGS. 1, 6 and 7, it will be appreciated how easily the apparatus (12) can be attached to the studs (11). For example, as shown in FIG. 7, the first backing member (13) can be easily placed from the dashed line view to the solid line view by pivoting the hinge (19) at approximately the place where the attaching screws (21) are on the left side of FIG. 7. This will allow the vertical groove (16) to go around a flange (11b) in stud (11).

The next step is to pivot the hinge (19) so that the second backing member (14) moves from the position shown in dashed lines in FIG. 7 to the position shown in solid lines in FIG. 7 wherein the vertical groove (16) will be moved over the flange extension (11b) of stud (11), the left stud (11) being the second stud and the right stud in FIG. 7 being the third stud of the four studs shown in FIG. 1 as stud (11).

After the first backing member (13) and the second backing member (14) are in the position shown in solid lines in FIG. 7, then the third backing member (15) is pivoted from the solid line position shown in FIG. 7 to the solid line position shown in FIG. 1. Fasteners (121) are like screws (21). Fasteners (121) attach the end portion (19a) and (19b) of the hinge (19) to the studs (11) over which they lie. After that has been done, screws (121) are also attached through middle portions of the hinge (19) to respective studs (11) as is clearly shown in FIG. 1. It will therefore be appreciated that this is much quicker and forms a more solid unit than merely trying to fasten the wood backing members (13), (14) and (15) individually to studs (11) without use of the sheet metal hinge (19).

Figure 13:
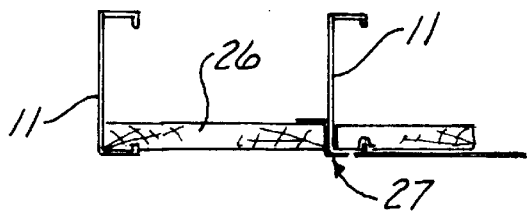
FIG. 13 is a cross sectional view taken along line 13—13 of FIG. 1 showing another aspect of the present invention which is a backing member with a flange on one end thereof for quick attachment to adjacent studs and which can be used on the corners where the studs may not be a standard sixteen inches apart.
Figure 14:
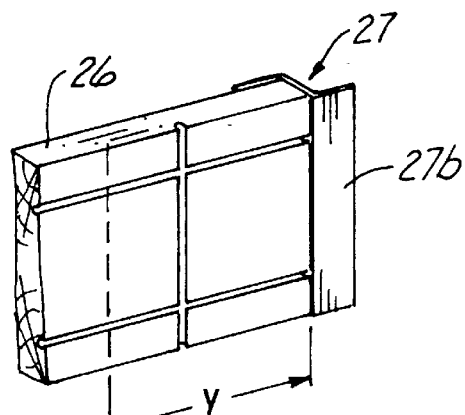
FIG. 14 is a perspective view showing the invention of FIG. 13.
Figure 15:
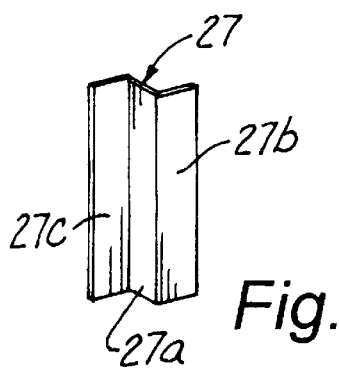
FIG. 15 is a perspective view of the flange which is attached to a wooden member of FIG. 13.

Typically, on the corners of a structure, the stud (11a) shown in FIG. 1 is a distance (y) which is less than the standard distance (x) between the other studs (11) in the wall except for the opposite corner. In order to facilitate quick and easy backing, a backing member (26) made preferably of wood, but which can be made of other materials, has a flange member (27) attached to one end thereof as shown in FIGS. 13, 14 and 15. Screws (121) extend through the end of the wood in center portion (27a) of flange (27) and then screws (121), also extend through flange portion (27b) and into the first stud (11) shown in FIG. 1. FIG. 14 shows vertical and horizontal grooves in the front face, but these are strictly optional in this end piece option (26).

Figure 16:
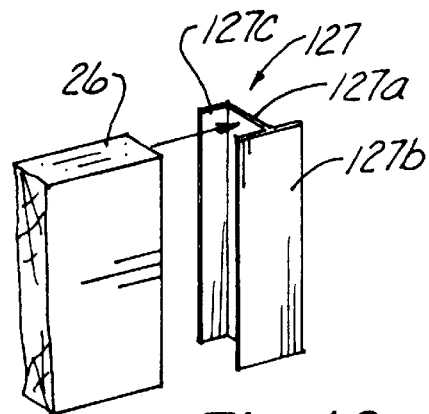
FIG. 16 is an alternate form of the flange and showing how a piece of wood can be received in a depression therein.

Alternatively, a member (127) as shown in FIG. 16 can be used to receive the end of wooden piece (26) and is fully equivalent to the structure shown in FIGS. 13–15. Member (127) has flanges (127a), (127b) and (127c). Also, these structures shown in FIGS. 13–16 can be used independently of the invention shown in FIG. 2 and is a quicker and more economical solution, especially from a labor standpoint, than merely attaching wooden pieces as backing members as in the prior art without the flanges (27) and (127).

Referring now to FIG. 8, a fire break member (31) is cut from a piece of stud, like studs (11) shown in FIG. 1. The ends (31a) can be folded up if desired and although this is a preferred embodiment, the fire break (31) would not have to extend the entire distance if it were merely used as a support member. But it works better as both a support member and a fire break in the preferred embodiment shown in FIGS. 8 and 9. The flange (31b) extends into the horizontal groove (17) of the second backing member (17) as shown in FIG. 8 and a flange (31b) on the other side will extend into a similar groove (17) in a rear second backing member (14) as well. These flanges (31b) can be separated slightly and they are naturally biased into the groove (17) to form an extremely strong structure in conjunction with backing members (14) and studs (11). The end flanges (31a) can also be attached by screws (121) to the studs (11) which further strengthens the entire structure.

If desired, this entire structure can be further strengthened by adding a second fire break member (31) on the bottom side as shown in FIG. 9, which would be attached just like the member (31) on the top, shown in FIG. 8. When constructed like the preferred embodiment shown in FIGS. 8 and 9, it forms a combination backing structure fire break and structural component which is unsurpassed by anything in the prior art. It can also be constructed quicker and more economically than anything heretofore available.

Figure 10:
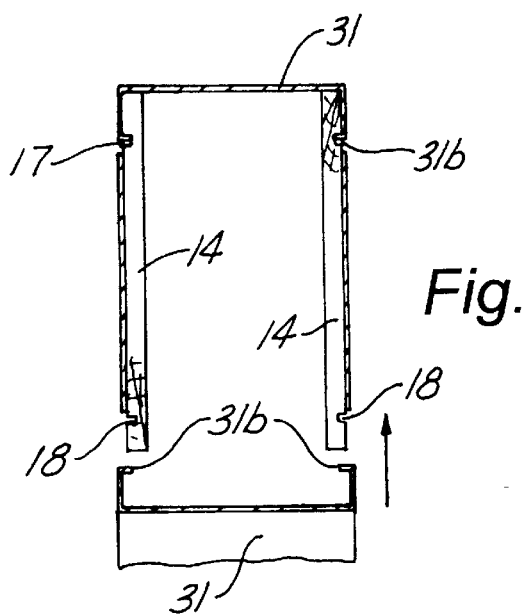
FIG. 10 is a cross sectional view taken along line 10—10 of FIG. 9.

Referring now to FIG. 10, a cross sectional view, along lines 10—10 of FIG. 9 illustrate the structural components and how they interlock and support each other.

Figure 11:
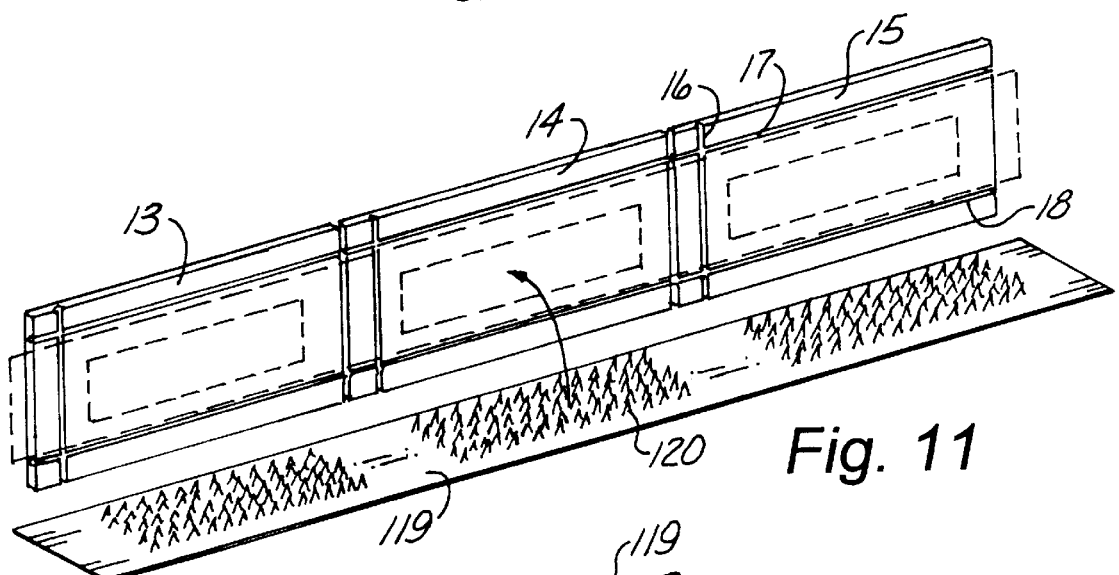
FIG. 11 shows an alternate view of the present invention showing projections formed in a sheet metal hinge to attach to wooden pieces by pushing the projections into the wood.
Figure 12:
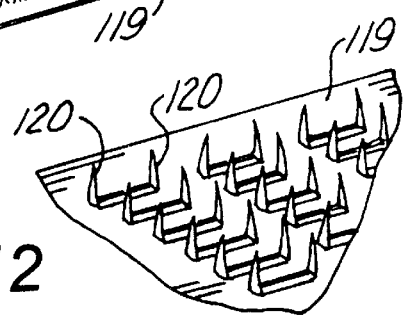
FIG. 12 is an enlarged prospective view of the projections shown in FIG. 11.

Referring to FIGS. 11 and 12, an alternate form of the one-piece hinge (119) is shown having a plurality of metal projections (120) to permit the hinge (19) to be placed in the position shown in dashed lines in FIG. 11 and then pressed into the backing members (13), (14) and (15). This structure is fully equivalent to using the screws (21) shown in FIG. 2. These projections (120) are similar to the projections in prior art plates used to construct trusses or the like.

Accordingly, it will be appreciated that the preferred embodiment does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. An apparatus for providing backing for U-shaped studs in a wall, said backing apparatus comprising:

a first backing member having a first end, a second end, a top, a bottom, a first side and a second side; wherein, the second end of the first backing member is longitudinally spaced from the first end of the second backing member.

a second backing member having a first end, a second end, a top, a bottom, a first side and a second side; wherein, the second end of the first backing member is longitudinally spaced from the first end of the second backing member.

a hinge operatively attached to said first side of said first and second backing members for permitting said second backing member to pivot with respect to the first backing member between a first position wherein the longitudinal axis of said first and second backing members are aligned in the same plane and a second position whereby the longitudinal axis of the first and second backing members are not aligned in the same plane, whereby said first backing member can be placed between a first and second adjacent upright U-shaped stud, the second backing member pivoted with respect to the first backing member to the second position, and then pivoting said second backing member to a first position thereof to be disposed between said second upright U-shaped stud and a third upright U-shaped stud whereby said second end of said first backing member is adjacent to and on one side of the second upright U-shaped stud and the first end of the second backing member is adjacent to and on the other side of said second upright U-shaped stud; and said first backing member having a vertical groove in said first side thereof for receiving a flange of the second upright U-shaped stud, said groove being at least partially covered by said hinge when the first and second backing members are in the first position thereof.

2. The apparatus of claim 1 including:

a third backing member having a first end, a second end, a top, a bottom, a first side and a second side;

said second backing member having a vertical groove in the first side thereof for receiving a flange of a U-shaped stud, said groove being at least partially covered by said hinge when the second and third backing members are in the first position thereof; and a second hinge operatively attached to said first side of said second and third backing members for permitting said third backing member to pivot with respect the second backing member between a first position wherein the longitudinal axis of said second and third backing members are substantially in the same plane and a second position whereby the longitudinal axis of the second and third backing members are not in the same plane, whereby said second backing member can be placed between said second and third adjacent upright U-shaped studs, the third backing member pivoted with respect to the second backing member to the second position, and then pivoting said third backing member to the first position thereof to be disposed between said third upright U-shaped stud and a fourth upright U-shaped stud closer to said third upright U-shaped stud than to said second upright U-shaped stud, whereby said second end of said second backing member is adjacent to and on one side of the third upright U-shaped stud and the first end of the third backing member is adjacent to and on the other side of said third upright U-shaped stud.

3. The apparatus of claim 2 wherein each of said backing members has a vertical groove in said first side thereof adjacent each end thereof whereby a flange of an upright U-shaped stud can extend therein.

4. The apparatus of claim 1 wherein each of said backing members has a vertical groove in said first side thereof adjacent each end thereof whereby a flange of an upright U-shaped stud can extend therein.

5. The apparatus of claim 4 including a horizontal member extending between said first and second upright U-shaped studs and on top of said first backing member, said horizontal member having a cross-section like one of said studs including a pair of flanges and wherein each of said backing members has a horizontal groove in said first side thereof adjacent the top thereof whereby a flange of said horizontal member can extend therein.

6. The apparatus of claim 1 including a horizontal member extending between said first and second upright U-shaped studs and on top of said first backing member, said horizontal member having a cross-section like one of said studs including a pair of flanges and wherein each of said backing members has a top horizontal groove in said first side adjacent the top and a bottom horizontal groove adjacent the bottom thereof whereby a flange of said horizontal member can extend therein.

7. The apparatus of claim 6 including a top backside backing member substantially identical to said first backing member, said backside backing member being disposed between said first and second upright U-shaped studs and one flange of said horizontal member extends into the top horizontal groove of the first backing member and the other flange of said horizontal member extends into the top horizontal groove of the backside backing member.

8. The apparatus of claim 7 including a bottom backside backing member substantially identical to said first backing member, said backside backing member being disposed between said first and second upright U-shaped studs and one flange of said horizontal member extends into the bottom horizontal groove of the first backing member and the other flange of said horizontal member extends into the bottom horizontal groove of the bottom backside backing member.

9. The apparatus of claim 6 including a bottom backside backing member substantially identical to said first backing member, said backside backing member being disposed between said first and second upright U-shaped studs and one flange of said horizontal member extends into the bottom horizontal groove of the first backing member and the other flange of said horizontal member extends into the bottom horizontal groove of the backside backing member.

10. The apparatus of claim 1 wherein said hinge is comprised of a flexible sheet.

11. The apparatus of claim 10 wherein said sheet is comprised of metal.

12. The apparatus of claim 1 wherein said hinge is comprised of a flexible metal sheet having projections therein extending into said backing members for holding the flexible sheet metal hinges attached to said first and second backing members.

13. The apparatus of claim 1 wherein, said backing members are constructed of wood.

14. The apparatus of claim 1 wherein sheet rock is attached to said upright U-shaped studs adjacent to said front side thereof of the backing members, thereby covering said studs and said backing members.

15. The apparatus of claim 7 wherein said horizontal member comprises a fire resistant material for creating a fire break.

16. The apparatus of claim 15 wherein said horizontal member and said studs are made of metal.

17. The apparatus of claim 16 wherein said metal is galvanized steel.

18. A apparatus comprising:

a first upright U-shaped stud;

a second upright U-shaped stud to one side of and spaced from said first U-shaped stud;

a third upright U-shaped stud to one side of and spaced from said first and said second U-shaped stud;

a first backing member having a first end, a second end, a top, a bottom, a first side and a second side, said first backing member being disposed between said first and second studs;

a second backing member having a first end, a second end, a top, a bottom, a first side and a second side, said second backing member being disposed between second and third studs;

a hinge operatively attached to said first side of said first and second backing members for permitting said second backing member to pivot with respect to the first backing member between a first position wherein the first side of each of said first and second backing members are substantially in the same plane and a second position whereby the first and second backing members are not in the same plane, whereby said first backing member can be placed between a first and second adjacent vertical stud, the second backing member pivoted with respect to the first backing member, and then pivoting said second backing member to a position to be disposed between said second vertical stud and said third stud adjacent to said second stud whereby said second end of said first backing member is adjacent to and on one side of the first stud and the first end of the second backing member is adjacent to and on the other side of said first stud.

19. The apparatus of claim 18 including:

a third backing member having a first end, a second end, a top, a bottom, a first side and a second side;

said second backing member having a vertical groove in the said first side thereof for receiving a flange of a U-shaped stud, said groove being at least partially covered by said hinge when the second and third backing members are in the first position thereof; and a second hinge operatively attached to said first side of said second and third backing members for permitting said third backing member to pivot with respect to the second backing member between a first position wherein the first side of each of said second and third backing members are substantially in the same plane and a second position whereby the second and third backing members are not in the same plane, whereby said second backing member can be placed between said second and third adjacent upright U-shaped studs, the third backing member pivoted with respect to the second backing member to the second position, and then pivoting said third backing member to the first position thereof to be disposed between said third upright U-shaped stud and a fourth upright U-shaped stud closer to said third upright U-shaped stud than to said second upright U-shaped stud, whereby said second end of said second backing member is adjacent to and on one side of the third upright U-shaped stud and the first end of the third backing member is adjacent to and on the other side of said third upright U-shaped stud.

20. The apparatus of claim 19 wherein each of said backing members has a vertical groove in said first side thereof adjacent each end thereof whereby a flange of an upright U-shaped stud can extend therein.

21. The apparatus of claim 18 wherein each of said backing members has a vertical groove in said first side thereof adjacent each end thereof whereby a flange of an upright U-shaped stud can extend therein.

22. The apparatus of claim 19 including a horizontal member extending between said first and second upright U-shaped studs and on top of said first backing member, said horizontal member having a cross-section like one of said studs including a pair of flanges and wherein each of said backing members has a horizontal groove in said first side thereof whereby a flange of said horizontal member can extend therein.

23. The apparatus of claim 18 including a horizontal member extending between said first and second upright U-shaped studs and on top of said first backing member, said horizontal member having a cross-section like one of said studs including a pair of flanges and wherein each of said backing members has a top horizontal groove adjacent the top and a bottom horizontal groove adjacent the bottom in said first side thereof whereby a flange of said horizontal member can extend therein.

24. The apparatus of claim 23 including a top backside backing member substantially identical to said first backing member, said backside backing member being disposed between said first and second upright U-shaped studs and one flange of said horizontal member extends into the top horizontal groove of the first backing member and the other flange of said horizontal member extends into the top horizontal groove of the backside backing member.

25. The apparatus of claim 24 including a bottom backside backing member substantially identical to said first backing member, said backside backing member being disposed between said first and second upright U-shaped studs and one flange of said horizontal member extends into the bottom horizontal groove of the first backing member and the other flange of said horizontal member extends into the bottom horizontal groove of the bottom backside backing member.

26. The apparatus of claim 23 including a bottom backside backing member substantially identical to said first backing member, said backside backing member being disposed between said first and second upright U-shaped studs and one flange of said horizontal member extends into the bottom horizontal groove of the first backing member and the other flange of said horizontal member extends into the bottom horizontal groove of the backside backing member.

27. The apparatus of claim 18 wherein said hinge is comprised of a flexible sheet.

28. The apparatus of claim 27 wherein said sheet is comprised of metal.

29. The apparatus of claim 18 wherein said hinge is comprised of a flexible metal sheet having projections therein extending into said backing members for holding the flexible sheet metal hinges attached to said first and second backing members.

30. The apparatus of claim 29 wherein said backing members are constructed of wood.

31. The apparatus of claim 18 wherein sheet rock is attached to said upright U-shaped studs adjacent to said front side thereof of the backing members thereby covering said studs and said backing members.

32. The apparatus of claim 24 wherein said horizontal member comprises a fire resistant material for creating a fire break.

33. The apparatus of claim 32 wherein said horizontal member and said studs are made of metal.

34. The apparatus of claim 33 wherein said metal is galvanized steel.

35. The apparatus of claim 34 wherein sheet rock is attached to said studs and covers said backing members.

36. The apparatus of claim 2,
wherein said first second and third upright U-shaped studs are equidistantly spaced from adjacent studs and an additional upright U-shaped stud that is not spaced equidistantly from one of the first and third upright U-shaped studs; and
a corner wall backing member having a first end, a second end, a top, a bottom, a first side and a second side, said corner wall backing member being disposed between said first and second studs, a flange operatively attached to and extending in a plane substantially the same or parallel thereto as the plane of the first side of the backing member, said flange being attached to said second upright U-shaped member and said first end of said backing member being attached to said first upright U-shaped member.

37. The apparatus of claim 19 wherein the first said hinge and second hinge are formed of one piece of flexible sheet metal which extends across said first, second and third backing member.

38. The apparatus of claim 36 wherein said flexible sheet of metal extends beyond from said first stud to said fourth stud whereby said flexible sheet can be attached to said first, second, third and fourth studs.

39. An apparatus comprising:
a first upright U-shaped stud having a front leg, a rear leg, and an intermediate leg extending between said front and rear legs;
a second upright U-shaped stud to one side of and spaced from said first U-shaped stud said second U-shaped stud having a front leg, a rear leg and an intermediate leg extending between said front and rear legs; and
a backing member having a first end, a second end, a top, a bottom, a first side and a second side, said backing member being disposed between said first and second studs, a flange operatively attached to and extending in a plane substantially the same or parallel thereto as the plane of the first side of the backing member, said flange being attached to the front leg of said second upright U-shaped stud, said first end of said backing member being attached to the front leg of said first upright U-shaped stud and the first side of the backing member having a vertical groove engageable with a portion of the front leg of said first upright U-shaped stud.

40. The apparatus of claim 39 wherein sheet rock is disposed to cover said studs and said extends close to and over the first side of said backing member.

41. A method of using an apparatus of a type comprising:
a first upright U-shaped stud;
a second upright U-shaped stud to one side of and spaced from said first U-shaped stud;
a third upright U-shaped stud to one side of and spaced from said first and said second U-shaped stud;
a first backing member having a first end, a second end, a top, a bottom, a first side and a second side, said first backing member being disposed between said first and second studs;
a second backing member having a first end, a second end, a top, a bottom, a first side and a second side, said second backing member being disposed between said second and third studs wherein, the second end of the first backing member is longitudinally spaced from the first end of the second backing member; and
a hinge operatively attached to said first side of said first and second backing members for permitting said second backing member to pivot with respect the first backing member between a first position wherein the longitudinal axis each of said first and second backing members are substantially in the same plane and a second position whereby the longitudinal axis of the first and second backing members are not in the same plane;
said method comprising:
placing said first backing member between a first and second adjacent vertical stud;
pivoting the second backing member with respect to the first backing member to the first position thereof;
pivoting said second backing member to the first position thereof; and
moving said second backing member to a position between said second vertical stud and a third stud adjacent to said second stud whereby said second end of said first backing member is adjacent to and on one side of the first stud and the first end of the second backing member is adjacent to and on the other side of said first stud.

* * * * *

UNITED STATES PATENT AND TRADEMARK OFFICE
CERTIFICATE OF CORRECTION

PATENT NO. : 6,705,056 B2 Page 1 of 7
APPLICATION NO. : 09/999874
DATED : October 19, 2001
INVENTOR(S) : Daniel W. Tollenaar It is certified that error appears in the above-identified patent and that said Letters Patent is hereby corrected as shown below:

Column 5, line 22, after "having" insert --a longitudinal axis,--

Column 5, line 23, delete "wherein"

Column 5, line 24, delete "the second end of the first backing member is longitu-"

Column 5, line 25, delete "dinally spaced from the first end of the second backing"

Column 5, line 26, delete "member."

Column 5, line 27, after "having" insert --a longitudinal axis,--

Column 5, line 31, delete "." and substitute therefore --;--

Column 5, line 36, delete "axis" and substitute therefore --axes--

Column 5, line 38, delete "axis" and substitute therefore -- axes--

Column 5, line 46, delete "a" and substitute therefore --the--

Column 5, line 52, delete "first" and substitute therefore --second--

Column 5, line 58, after "having" insert --a longitudinal axis,--

Column 5, line 60, delete "second" and substitute therefore --third --

Column 6, line 1, after "respect" insert --to--

Column 6, line 2, delete "a" and substitute therefore --the--

Column 6, line 2, after "position" insert --of the second and third backing members--

Column 6, line 3, delete "axis" and substitute therefore --axes--

Column 6, line 5, delete "axis" and substitute therefore --axes--

Column 6, line 21, delete "each of"

Column 6, line 21, after "said" insert --first--

Column 6, line 22, delete "members" and substitute therefore --member--

UNITED STATES PATENT AND TRADEMARK OFFICE
CERTIFICATE OF CORRECTION

PATENT NO. : 6,705,056 B2
APPLICATION NO. : 09/999874
DATED : October 19, 2001
INVENTOR(S) : Daniel W. Tollenaar It is certified that error appears in the above-identified patent and that said Letters Patent is hereby corrected as shown below:

Column 6, line 23, delete "each" and substitute therefore --the first--

Column 6, line 25, delete "each of"

Column 6, line 25, after "said" insert --first--

Column 6, line 26, delete "members" and substitute therefore --member--

Column 6, line 27, delete "each" and substitute therefore --the first--

Column 6, line 33, delete "each of"

Column 6, line 33, after "said" insert --first--

Column 6, line 34, delete "members" and substitute therefore --member--

Column 6, line 41, delete "each of"

Column 6, line 41, after "said" insert --first--

Column 6, line 42, delete "members" and substitute therefore --member--

Column 6, line 43, after "groove" insert --in the first side--

Column 6, line 46, delete "top"

Column 6, line 54, delete "backside"

Column 6, line 55, delete "backing" and substitute therefore --horizontal--

Column 6, line 55, delete "first backing" and substitute therefore --horizontal--

Column 6, line 56, delete "backside backing" and substitute therefore --bottom horizontal--

Column 6, line 58, after "said" insert --bottom--

Column 6, line 60, after "said" insert --bottom--

Column 6, line 61, delete the second use of "bottom"

UNITED STATES PATENT AND TRADEMARK OFFICE
CERTIFICATE OF CORRECTION

PATENT NO.      : 6,705,056 B2
APPLICATION NO. : 09/999874
DATED           : October 19, 2001
INVENTOR(S)     : Daniel W. Tollenaar It is certified that error appears in the above-identified patent and that said Letters Patent is hereby corrected as shown below:

Column 6, line 63, delete "backside"

Column 6, line 64, delete the first use of "backing" and substitute therefore --horizontal--

Column 6, line 64, delete "first backing" and substitute therefore --horizontal--

Column 6, line 65, delete "backside backing" and substitute therefore --bottom horizontal--

Column 6, line 67, after "said" insert --bottom--

Column 7, line 2, after "said" insert --bottom--

Column 7, line 11, delete "hinges" and substitute therefore --hinge--

Column 7, line 13, delete "wherein," and substitute therefore --wherein--

Column 7, line 16, delete "front" and substitute therefore --first--

Column 7, line 48, delete "a" and substitute therefore --the--

Column 7, line 49, delete "vertical" and substitute therefore --upright U-shaped--

Column 7, line 49, delete "stud" and substitute therefore --studs--

Column 7, line 52, delete "vertical"

Column 7, line 55, delete "first" and substitute therefore --second--

Column 7, line 57, delete "first" and substitute therefore --second--

Column 7, line 61, delete "second" and substitute therefore --third--

Column 7, line 62, delete "said"

Column 7, line 65, delete "the" and substitute therefore --a--

Column 8, line 2, delete "a" and substitute therefore --the--

Column 8, line 2, after "position" insert --of the second and third backing members--

UNITED STATES PATENT AND TRADEMARK OFFICE
CERTIFICATE OF CORRECTION

PATENT NO. : 6,705,056 B2
APPLICATION NO. : 09/999874
DATED : October 19, 2001
INVENTOR(S) : Daniel W. Tollenaar It is certified that error appears in the above-identified patent and that said Letters Patent is hereby corrected as shown below:

Column 8, line 21, delete "each of"

Column 8, line 21, after "said" insert --first--

Column 8, line 22, delete "members" and substitute therefore --member--

Column 8, line 23, delete "each" and substitute therefore --the first--

Column 8, line 25, delete "each of"

Column 8, line 25, after "said" insert --first--

Column 8, line 26, delete "members" and substitute therefore --member--

Column 8, line 27, delete "each" and substitute therefore --the first--

Column 8, line 33, delete "each of"

Column 8, line 33, after "said" insert --first--

Column 8, line 34, delete "members" and substitute therefore --member--

Column 8, line 41, delete "each of"

Column 8, line 41, after "said" insert --first--

Column 8, line 42, delete "members" and substitute therefore --member--

Column 8, line 42, after "groove" insert --in the first side--

Column 8, line 43, after "groove" insert --in the first side--

Column 8, line 46, delete "top"

Column 8, line 54, delete "back-"

Column 8, line 55, delete "side backing" and substitute therefore --horizontal--

Column 8, line 55, delete "first"

Column 8, line 56, delete "backing" and substitute therefore --horizontal--

UNITED STATES PATENT AND TRADEMARK OFFICE
CERTIFICATE OF CORRECTION

| | | |
|---|---|---|
| PATENT NO. | : 6,705,056 B2 | |
| APPLICATION NO. | : 09/999874 | |
| DATED | : October 19, 2001 | |
| INVENTOR(S) | : Daniel W. Tollenaar | |

It is certified that error appears in the above-identified patent and that said Letters Patent is hereby corrected as shown below:

Column 8, line 56, delete "backside backing" and substitute therefore --bottom horizontal--

Column 8, line 58, after "said" insert --bottom--

Column 8, line 60, after "said" insert --bottom--

Column 8, line 61, delete the second use of "bottom"

Column 8, line 63, delete "back-"

Column 8, line 64, delete "side backing" and substitute therefore --horizontal--

Column 8, line 64, delete "first"

Column 8, line 65, delete "backing" and substitute therefore --horizontal--

Column 8, line 65, delete "backside backing" and substitute therefore --bottom horizontal--

Column 8, line 67, after "said" insert --bottom--

Column 9, line 2, after "said" insert --bottom--

Column 9, line 12, delete "hinges" and substitute therefore --hinge--

Column 9, line 17, delete "front" and substitute therefore --first--

Column 9, line 30, after "first" insert a ","

Column 9, line 36, after "second side" insert --and wherein the first side is disposed in a plane and wherein--

Column 9, line 37, delete "being" and substitute therefore --is--

Column 9, line 40, after "same" insert --as--

Column 9, line 40, delete "thereto as" and substitute therefore --to--

Column 9, line 42, delete "member" and substitute therefore --stud--

UNITED STATES PATENT AND TRADEMARK OFFICE
CERTIFICATE OF CORRECTION

| | |
|---|---|
| PATENT NO. | : 6,705,056 B2 |
| APPLICATION NO. | : 09/999874 |
| DATED | : October 19, 2001 |
| INVENTOR(S) | : Daniel W. Tollenaar |

It is certified that error appears in the above-identified patent and that said Letters Patent is hereby corrected as shown below:

Column 9, line 44, delete "member and substitute therefore --stud--

Column 9, line 45, delete "said"

Column 9, line 46, after "and" insert --the--

Column 9, line 48, delete "member" and substitute therefore --members--

Column 9, line 49, delete "36" and substitute therefore --37 including a fourth stud and--

Column 10, line 5, after "same" insert --as--

Column 10, line 5, delete "thereto as" and substitute therefore --to--

Column 10, line 5, delete "the" and substitute therefore --a--

Column 10, line 15, after the second use of "said" insert --sheet rock--

Column 10, line 23, after "having" insert --a longitudinal axis,--

Column 10, line 27, after "having" insert --a longitudinal axis,--

Column 10, line 30, delete "wherein," and substitute therefore --wherein--

Column 10, line 35, after "respect" insert --to--

Column 10, line 37, delete "axis" and substitute therefore --axes--

Column 10, line 37, delete "each of said" and substitute therefore --of the--

Column 10, line 39, delete "axis" and substitute therefore --axes--

Column 10, line 44 - delete "vertical" and substitute therefore --upright U-shaped--

Column 10, line 46 - delete the second use of "first" and substitute therefore --second--

Column 10, line 50 - delete "vertical" and substitute therefore --upright U-shaped--

Column 10, line 50 - delete "a" and substitute therefore --the--

UNITED STATES PATENT AND TRADEMARK OFFICE
CERTIFICATE OF CORRECTION

PATENT NO. : 6,705,056 B2
APPLICATION NO. : 09/999874
DATED : October 19, 2001
INVENTOR(S) : Daniel W. Tollenaar It is certified that error appears in the above-identified patent and that said Letters Patent is hereby corrected as shown below:

Column 10, line 53 - delete "first" and substitute therefore --second--

Column 10, line 55 - delete "first" and substitute therefore --second--

Signed and Sealed this

First Day of May, 2007

JON W. DUDAS
*Director of the United States Patent and Trademark Office*

UNITED STATES PATENT AND TRADEMARK OFFICE
CERTIFICATE OF CORRECTION

PATENT NO.       : 6,705,056 B2
APPLICATION NO.  : 09/999874
DATED            : March 16, 2004
INVENTOR(S)      : Daniel W. Tollenaar It is certified that error appears in the above-identified patent and that said Letters Patent is hereby corrected as shown below:

Column 5, line 22, after "having" insert --a longitudinal axis,--

Column 5, line 23, delete "wherein"

Column 5, line 24, delete "the second end of the first backing member is longitu-"

Column 5, line 25, delete "dinally spaced from the first end of the second backing"

Column 5, line 26, delete "member."

Column 5, line 27, after "having" insert --a longitudinal axis,--

Column 5, line 31, delete "." and substitute therefore --;--

Column 5, line 36, delete "axis" and substitute therefore --axes--

Column 5, line 38, delete "axis" and substitute therefore -- axes--

Column 5, line 46, delete "a" and substitute therefore --the--

Column 5, line 52, delete "first" and substitute therefore --second--

Column 5, line 58, after "having" insert --a longitudinal axis,--

Column 5, line 60, delete "second" and substitute therefore --third --

Column 6, line 1, after "respect" insert --to--

Column 6, line 2, delete "a" and substitute therefore --the--

Column 6, line 2, after "position" insert --of the second and third backing members--

Column 6, line 3, delete "axis" and substitute therefore --axes--

Column 6, line 5, delete "axis" and substitute therefore --axes--

Column 6, line 21, delete "each of"

Column 6, line 21, after "said" insert --first--

Column 6, line 22, delete "members" and substitute therefore --member--

UNITED STATES PATENT AND TRADEMARK OFFICE
CERTIFICATE OF CORRECTION

PATENT NO. : 6,705,056 B2
APPLICATION NO. : 09/999874
DATED : March 16, 2004
INVENTOR(S) : Daniel W. Tollenaar It is certified that error appears in the above-identified patent and that said Letters Patent is hereby corrected as shown below:

Column 6, line 23, delete "each" and substitute therefore --the first--

Column 6, line 25, delete "each of"

Column 6, line 25, after "said" insert --first--

Column 6, line 26, delete "members" and substitute therefore --member--

Column 6, line 27, delete "each" and substitute therefore --the first--

Column 6, line 33, delete "each of"

Column 6, line 33, after "said" insert --first--

Column 6, line 34, delete "members" and substitute therefore --member--

Column 6, line 41, delete "each of"

Column 6, line 41, after "said" insert --first--

Column 6, line 42, delete "members" and substitute therefore --member--

Column 6, line 43, after "groove" insert --in the first side--

Column 6, line 46, delete "top"

Column 6, line 54, delete "backside"

Column 6, line 55, delete "backing" and substitute therefore --horizontal--

Column 6, line 55, delete "first backing" and substitute therefore --horizontal--

Column 6, line 56, delete "backside backing" and substitute therefore --bottom horizontal--

Column 6, line 58, after "said" insert --bottom--

Column 6, line 60, after "said" insert --bottom--

Column 6, line 61, delete the second use of "bottom"

UNITED STATES PATENT AND TRADEMARK OFFICE
CERTIFICATE OF CORRECTION

PATENT NO. : 6,705,056 B2
APPLICATION NO. : 09/999874
DATED : March 16, 2004
INVENTOR(S) : Daniel W. Tollenaar It is certified that error appears in the above-identified patent and that said Letters Patent is hereby corrected as shown below:

Column 6, line 63, delete "backside"

Column 6, line 64, delete the first use of "backing" and substitute therefore --horizontal--

Column 6, line 64, delete "first backing" and substitute therefore --horizontal--

Column 6, line 65, delete "backside backing" and substitute therefore --bottom horizontal--

Column 6, line 67, after "said" insert --bottom--

Column 7, line 2, after "said" insert --bottom--

Column 7, line 11, delete "hinges" and substitute therefore --hinge--

Column 7, line 13, delete "wherein," and substitute therefore --wherein--

Column 7, line 16, delete "front" and substitute therefore --first--

Column 7, line 48, delete "a" and substitute therefore --the--

Column 7, line 49, delete "vertical" and substitute therefore --upright U-shaped--

Column 7, line 49, delete "stud" and substitute therefore --studs--

Column 7, line 52, delete "vertical"

Column 7, line 55, delete "first" and substitute therefore --second--

Column 7, line 57, delete "first" and substitute therefore --second--

Column 7, line 61, delete "second" and substitute therefore --third--

Column 7, line 62, delete "said"

Column 7, line 65, delete "the" and substitute therefore --a--

Column 8, line 2, delete "a" and substitute therefore --the--

Column 8, line 2, after "position" insert --of the second and third backing members--

UNITED STATES PATENT AND TRADEMARK OFFICE
CERTIFICATE OF CORRECTION

PATENT NO.         : 6,705,056 B2
APPLICATION NO. : 09/999874
DATED                  : March 16, 2004
INVENTOR(S)       : Daniel W. Tollenaar It is certified that error appears in the above-identified patent and that said Letters Patent is hereby corrected as shown below:

Column 8, line 21, delete "each of"

Column 8, line 21, after "said" insert --first--

Column 8, line 22, delete "members" and substitute therefore --member--

Column 8, line 23, delete "each" and substitute therefore --the first--

Column 8, line 25, delete "each of"

Column 8, line 25, after "said" insert --first--

Column 8, line 26, delete "members" and substitute therefore --member--

Column 8, line 27, delete "each" and substitute therefore --the first--

Column 8, line 33, delete "each of"

Column 8, line 33, after "said" insert --first--

Column 8, line 34, delete "members" and substitute therefore --member--

Column 8, line 41, delete "each of"

Column 8, line 41, after "said" insert --first--

Column 8, line 42, delete "members" and substitute therefore --member--

Column 8, line 42, after "groove" insert --in the first side--

Column 8, line 43, after "groove" insert --in the first side--

Column 8, line 46, delete "top"

Column 8, line 54, delete "back-"

Column 8, line 55, delete "side backing" and substitute therefore --horizontal--

Column 8, line 55, delete "first"

Column 8, line 56, delete "backing" and substitute therefore --horizontal--

UNITED STATES PATENT AND TRADEMARK OFFICE
CERTIFICATE OF CORRECTION

| | | |
|---|---|---|
| PATENT NO. | : 6,705,056 B2 | |
| APPLICATION NO. | : 09/999874 | |
| DATED | : March 16, 2004 | |
| INVENTOR(S) | : Daniel W. Tollenaar | |

It is certified that error appears in the above-identified patent and that said Letters Patent is hereby corrected as shown below:

Column 8, line 56, delete "backside backing" and substitute therefore --bottom horizontal--

Column 8, line 58, after "said" insert --bottom--

Column 8, line 60, after "said" insert --bottom--

Column 8, line 61, delete the second use of "bottom"

Column 8, line 63, delete "back-"

Column 8, line 64, delete "side backing" and substitute therefore --horizontal--

Column 8, line 64, delete "first"

Column 8, line 65, delete "backing" and substitute therefore --horizontal--

Column 8, line 65, delete "backside backing" and substitute therefore --bottom horizontal--

Column 8, line 67, after "said" insert --bottom--

Column 9, line 2, after "said" insert --bottom--

Column 9, line 12, delete "hinges" and substitute therefore --hinge--

Column 9, line 17, delete "front" and substitute therefore --first--

Column 9, line 30, after "first" insert a ","

Column 9, line 36, after "second side" insert --and wherein the first side is disposed in a plane and wherein--

Column 9, line 37, delete "being" and substitute therefore --is--

Column 9, line 40, after "same" insert --as--

Column 9, line 40, delete "thereto as" and substitute therefore --to--

Column 9, line 42, delete "member" and substitute therefore --stud--

UNITED STATES PATENT AND TRADEMARK OFFICE
CERTIFICATE OF CORRECTION

PATENT NO.       : 6,705,056 B2
APPLICATION NO.  : 09/999874
DATED            : March 16, 2004
INVENTOR(S)      : Daniel W. Tollenaar It is certified that error appears in the above-identified patent and that said Letters Patent is hereby corrected as shown below:

Column 9, line 44, delete "member and substitute therefore --stud--

Column 9, line 45, delete "said"

Column 9, line 46, after "and" insert --the--

Column 9, line 48, delete "member" and substitute therefore --members--

Column 9, line 49, delete "36" and substitute therefore --37 including a fourth stud and--

Column 10, line 5, after "same" insert --as--

Column 10, line 5, delete "thereto as" and substitute therefore --to--

Column 10, line 5, delete "the" and substitute therefore --a--

Column 10, line 15, after the second use of "said" insert --sheet rock--

Column 10, line 23, after "having" insert --a longitudinal axis,--

Column 10, line 27, after "having" insert --a longitudinal axis,--

Column 10, line 30, delete "wherein," and substitute therefore --wherein--

Column 10, line 35, after "respect" insert --to--

Column 10, line 37, delete "axis" and substitute therefore --axes--

Column 10, line 37, delete "each of said" and substitute therefore --of the--

Column 10, line 39, delete "axis" and substitute therefore --axes--

Column 10, line 44 - delete "vertical" and substitute therefore --upright U-shaped--

Column 10, line 46 - delete the second use of "first" and substitute therefore --second--

Column 10, line 50 - delete "vertical" and substitute therefore --upright U-shaped--

Column 10, line 50 - delete "a" and substitute therefore --the--

UNITED STATES PATENT AND TRADEMARK OFFICE
CERTIFICATE OF CORRECTION

PATENT NO. : 6,705,056 B2
APPLICATION NO. : 09/999874
DATED : March 16, 2004
INVENTOR(S) : Daniel W. Tollenaar It is certified that error appears in the above-identified patent and that said Letters Patent is hereby corrected as shown below:

Column 10, line 53 - delete "first" and substitute therefore --second--

Column 10, line 55 - delete "first" and substitute therefore --second--

This certificate supersedes Certificate of Correction issued May 1, 2007.

Signed and Sealed this

Fifth Day of June, 2007

JON W. DUDAS
*Director of the United States Patent and Trademark Office*